United States Patent
Duarte et al.

(10) Patent No.: US 9,933,197 B2
(45) Date of Patent: Apr. 3, 2018

(54) VERTICAL COUNTER-FLOW IMMERSION FREEZER

(71) Applicant: Air Liquide Canada, Inc., Montreal (CA)

(72) Inventors: Daniel D. Duarte, Newark, DE (US); Candice John, Quebec (CA); Stephanie Mortenson, Edmonton (CA)

(73) Assignee: AIr Liquide Canada, Inc., Montreal (CA)

( * ) Notice: Subject to any disclaimer, the term of this patent is extended or adjusted under 35 U.S.C. 154(b) by 470 days.

(21) Appl. No.: 14/144,802

(22) Filed: Dec. 31, 2013

(65) Prior Publication Data

US 2015/0184915 A1 Jul. 2, 2015

(51) Int. Cl.
F25D 17/02 (2006.01)
F25D 3/11 (2006.01)
F25D 3/10 (2006.01)
A23L 3/375 (2006.01)

(52) U.S. Cl.
CPC .............. *F25D 3/11* (2013.01); *A23L 3/375* (2013.01); *F25D 3/10* (2013.01)

(58) Field of Classification Search
CPC ... F25D 3/11; F25D 3/10; F25D 17/02; F25D 25/04
USPC ................................................ 62/64, 63, 62
See application file for complete search history.

(56) References Cited

U.S. PATENT DOCUMENTS

| | | | |
|---|---|---|---|
| 3,368,363 A * | 2/1968 | Buehler | A23B 4/062 426/524 |
| 3,774,524 A * | 11/1973 | Howard | A23L 3/375 127/5 |
| 3,832,864 A | 9/1974 | Rasovich | |
| 3,880,317 A * | 4/1975 | Arnett | B60K 15/04 141/325 |
| 4,655,047 A | 4/1987 | Temple et al. | |
| 4,748,817 A * | 6/1988 | Oura | F25C 1/00 406/152 |
| 4,843,840 A | 7/1989 | Gibson | |
| 4,888,956 A | 12/1989 | le Roux Murray | |
| 4,982,577 A | 1/1991 | Milankov et al. | |
| 5,126,156 A | 6/1992 | Jones | |
| 5,295,366 A * | 3/1994 | Lopez | F25D 9/005 62/266 |
| 5,437,691 A * | 8/1995 | Lauterbach | B01D 7/00 23/295 R |
| 5,438,840 A * | 8/1995 | Barber | A01F 25/00 62/374 |
| 5,522,227 A | 6/1996 | Appolonia | |
| 5,522,237 A | 6/1996 | Wardle | |
| 6,000,229 A | 12/1999 | Jones et al. | |
| 6,216,470 B1 | 4/2001 | Kosock et al. | |
| 6,349,549 B1 | 2/2002 | Angus et al. | |
| 7,475,554 B2 | 1/2009 | Irvine et al. | |
| 2005/0120724 A1* | 6/2005 | Germain | A23G 7/0093 62/63 |

(Continued)

Primary Examiner — Len Tran
Assistant Examiner — Ana Vazquez
(74) Attorney, Agent, or Firm — Christopher J. Cronin

(57) ABSTRACT

A product is chilled or at least partially frozen by descending against a counter-current flow of liquid nitrogen in a vertical freezer containing an immersion bath of liquid nitrogen and the chilled or at least partially frozen product is extracted from the bath. The product may optionally be a liquid, semi-solid, suspension or slurry.

20 Claims, 3 Drawing Sheets

(56) References Cited

U.S. PATENT DOCUMENTS

| | | |
|---|---|---|
| 2005/0120726 A1 | 6/2005 | Kamm |
| 2007/0281067 A1 | 12/2007 | Braithwaite |
| 2011/0120150 A1* | 5/2011 | Braithwaite .............. F25D 3/11 62/64 |
| 2014/0196751 A1* | 7/2014 | Dull ...................... A23L 1/0157 134/25.3 |

* cited by examiner

VERTICAL COUNTER-FLOW IMMERSION FREEZER

CROSS-REFERENCE TO RELATED APPLICATIONS

None.

BACKGROUND

The freezing of discrete portions of food or non-food materials using liquid nitrogen has been practiced on a commercial scale for several years. While a wide variety of cryogenic apparatuses have been used to accomplish the freezing, many of them can be grouped into five typical types of apparatuses: batch freezers, immersion freezers, tunnel freezers, spiral freezers, and pelletizers.

Cabinet or batch freezers use a combination of cryogen spray and fans to rapidly cool or freeze products on racks. Batch freezers are available in different sizes and are generally adopted by small to medium sized food processors when available floor space is limited. However, freezing foodstuff in a batch freezer is not a continuous process. Moreover, because the product must be placed on trays it is difficult to process liquids or generate spherical pellets which are advantageous for downstream processing, packaging and end-use.

Straight freezing tunnels freeze foodstuff in a horizontal direction. Typically, foodstuffs are loaded on a mesh conveyor belt and cryogen is sprayed onto the product. Fans are used to increase convection and improve efficiency. When processing fine solids, however, product loss can occur through the conveyor belt mesh. While semi-solids and liquids are difficult to process, the otherwise mesh belt can be modified to a solid surface material allowing it to make disc shaped pellets. Such modified belts are not able to freeze the semi-solid or liquid into spherical pellets. Liquid nitrogen losses associated with equipment cool down and steady state operation of straight freezing tunnels will vary depending on the design, materials of fabrication and size. Cleaning straight tunnel freezers can be time consuming, especially when the freezer is poorly designed or maintained.

Immersion freezers (including pelletizers) freeze food continuously in a horizontal direction using a conveyor belt to move foodstuffs through a bath of liquid nitrogen. The liquid nitrogen bath must be replenished regularly in order to consistently freeze the foodstuffs. Immersion baths are typically used for individually quick frozen (IQF) applications to partially or fully freeze small, solid foodstuffs. Although immersion freezers can make very small pellets from semi-solids and liquids, large diameter spherical pellets are difficult to generate because they are inadvertently deformed by the belt. Liquid nitrogen losses associated with equipment cool down and steady state operation will vary depending on the design, materials of fabrication and size.

One special type of immersion freezer is disclosed by U.S. Pat. No. 5,522,237. The product to be frozen falls into a "downward" leg of a U-shaped freezer filled with liquid nitrogen. An auger screw in the "upward" leg induces a flow of liquid nitrogen downwardly through the downward leg, through the bottom of the U-shape, and upwardly through the upward leg. This flow of liquid nitrogen carries along with it the product that falls to the bottom of the downward leg. Hence, the immersion freezer is co-current. The product is then directed upwardly through the upward leg by the auger screw. The auger screw is driven to provide a higher liquid level in the upward leg than the downward leg such that the combined liquid nitrogen and product at the top of the auger screw is directed onto a downward chute. The combined liquid nitrogen and product are separated by a conveyor extending below the chute that collects the product while allowing the liquid nitrogen to pass through. The liquid nitrogen passing through is collected by another downward chute feeding into the top portion of the downward leg to complete a cycle of liquid nitrogen flow. U.S. Pat. No. 5,522,237 does not disclose a way to modify the residence time of the product in the liquid nitrogen. In order to form more or less spherical product from a liquid or semi-solid fed into the immersion freezer, the height of the vessel would have to be high enough to fully freeze the falling liquid droplets before they are transported by the auger screw conveyor. Otherwise, the more or less spherical shape would be deleteriously modified by the mechanical action of the auger screw. Therefore, the freezer vessel dimensions and/or droplet diameter would have to be optimized for freezing spherical pellets. This freezer is therefore limited because a change in the desired droplet diameter or a change in the product composition (with an accompanying change in the freezing time) would no longer result in fully freezing of the droplet before its shape is deleteriously modified by the auger screw.

Mold filling freezers for shape forming, such as the CRYOLINE® PE Freezer promoted available from Linde, were designed to process semi-solid and liquid products. This continuous freezer only crusts or partially freezes the semi-solid or liquid product in a horizontal direction with the use of a pre-cooled belt configured as a mould for producing small pellets. The resultant crust-frozen or partially-frozen pellet sheets must then be fully frozen in a conventional tunnel freezer and separated into individual pellets for further processing.

Hybrid spray and immersion tunnels, such as the Crust Flow P (CFP) and Crust Flow P2 (CFP2) available from Air Liquide, have a non-stick polymer belt which travels through a small bath of liquid nitrogen coupled with a top spray to assist in freezing. The CFP and CFP2 are particularly well adapted to crust freeze sticky or sauce-covered solid products because of the non-stick belt. The Crust Flow line of freezers can produce disk shaped chips from semi-solids and liquids. However, it is impossible to produce spherical pellets with the current Crust Flow line of freezers because the product freezes flat on the belt. While the CFP and CFP2 are very efficient freezers in terms of liquid nitrogen consumption, these freezers have a non-insignificant footprint because of their length (about 4.2 m) and because they freeze in a horizontal direction. Moreover, these freezers are designed to crust freeze up to 2500 kg/hr of product and thus may be overdesigned for smaller food processors.

Vibratory immersion freezers, such as the Crust Flow V available from Air Liquide, is a small immersion freezer (1 to 1.2 m wide and 1.7 to 2.3 m long) that uses a small vibrating bath of liquid nitrogen to transport product from one end of the freezer to the other. The Crust Flow V is particularly well adapted to crust-freeze small IQF products (e.g., cherries, cheese, cubes, and lemon juice). However, its ability to process liquids is limited due to the depth of the vibrating bath. The product residence time is also fairly short due of the length which limits the size or volume of frozen particles. Finally, the vibratory action of the bath can result in product breakage.

Another particular immersion freezer is the ALIGAL CC available from Air Liquide. This freezer is a horizontal immersion tunnel which uses a continuous current of liquid to transport the product to an exit conveyor within 10 s to 15 s. The liquid nitrogen current is generated by a paddle wheel which transports the product at a speed comparable to that of a traditional conveyor belt. The ALIGAL CC can process light solids, semi-solids and liquids because only liquid nitrogen is used to transport the product. It is also possible to freeze spherical liquid pellets due to the absence of a conveyor in the freezing zone (other than the small portion of the conveyor used to withdraw the frozen product). However, relatively larger solids are typically not processed in the ALIGAL CC since larger solids will tend to sink to the bottom of the liquid nitrogen bath. The ALIGAL CC is over 20 ft (6.1 m) long and is designed to process 1 to 4 tons/hr. This particular equipment is well suited for established food processors because of the large product throughput required to make this equipment cost effective. Making the design of the freezer more attractive for smaller food processors cannot be achieved by simply reducing both the width and length (hence, reducing the footprint). Regardless of product throughput, a certain residence time in the liquid nitrogen is required to freeze a specific product. Thus, there is a limit to which the footprint may be reduced through adjustment of the liquid nitrogen flow rate, the dimensions of the freezer (width mostly), and the exit conveyor speed.

Thus, there is a need for a freezer which has a relatively smaller footprint attractive to relatively smaller food processors that can freeze products, especially liquid or semi-solid product into more or less spherically shaped pellets, with the optional capability of operating on a continuous or near-continuous basis.

SUMMARY

The invention is provided for satisfying the above need.

There is disclosed a method for chilling or at least partially freezing product in an immersion freezer containing a bath of liquid nitrogen. The method includes the following steps. The product to be chilled or frozen is deposited onto a surface of the liquid nitrogen bath. The deposited product is allowed to descend down through the bath against a counter-current flow of liquid nitrogen through the bath to produce chilled or at least partially frozen product. The chilled or at least partially frozen product is extracted from the bath.

There is also disclosed a vertical liquid nitrogen immersion freezer, comprising: an insulated immersion bath tank adapted and configured to contain an immersion bath of liquid nitrogen; a material feeder operatively associated with said immersion bath tank to deliver a feed of product to a liquid immersion bath contained within said immersion bath tank for chilling or at least partially freezing the product; a pump or propeller system; one or more injection ports fluidly communicating with an outlet side of said pump or propeller system via a feed line extending through a wall of said immersion bath tank, said one or more injection ports being disposed within an interior receiving liquid nitrogen from the pump and being adapted and configured to inject liquid nitrogen straight up through an interior of said immersion bath tank; and one or more suction ports disposed at an upper region of said immersion bath tank and fluidly communicating between an interior of said immersion bath tank and a return line that fluidly communicates with a suction inlet side of said pump or propeller system, said one or more suction ports withdrawing liquid nitrogen from said immersion bath tank through operation of said pump or propeller system and directing the withdrawn liquid nitrogen into said return line.

The method and/or freezer may include one or more of the following aspects:
  the counter-current flow is produced by pumping liquid nitrogen with a pump into an injection port comprising a vertical tube that is disposed within a bottom interior portion of the a tank containing the bath.
  liquid nitrogen is recirculated from a top region of the tank via one or more suction portions and to a suction inlet of the pump.
  a residence time of the product within the immersion bath is changed by changing a speed of the pump.
  the product is a liquid, semi-solid, suspension or slurry.
  the product is solid.
  the product is selected from the group consisting of: a chemical suspension, slurry or solution; a liquid, semi-solid or solid pharmaceutical product; a liquid, semi-solid or solid foodstuff; and a liquid, semi-solid or solid food additive.
  said step of extracting the product comprises the steps of: opening an upper isolation valve in fluid communication with a bottom interior region of a tank containing the liquid nitrogen bath; allowing a slug of liquid nitrogen and the product to empty out of the tank and into an intermediate container via the open upper isolation valve, the slug being prevented from flowing down out of the intermediate container by a closed lower isolation valve; closing the upper isolation valve; and opening the lower isolation valve to allow the slug to flow down out of the intermediate container.
  said step of extracting the product comprises the step of continuously operating a valve fluidly communicating with a bottom interior of a tank containing the liquid nitrogen immersion bath to place said continuously operated valve in succeeding ones of a plurality of positions, wherein each position allows an amount of liquid nitrogen and product to empty from the tank, wherein said valve is a butterfly, gate, or rotary valve.
  said step of extracting the product comprises the steps of: rotating an auger screw having a bottom end that extends into a bottom interior region of a tank containing the liquid nitrogen immersion bath to convey liquid nitrogen and product from the bottom interior region to a top of the auger screw; and allowing the conveyed liquid nitrogen and product to cascade off of the top of the auger screw.
  an exhaust system is disposed above said immersion bath tank that is adapted and configured to vent vaporized liquid nitrogen through ducting to location remote from the freezer.
  said immersion bath tank has a tubular configuration that is tapered inwardly towards a bottom region thereof.
  a sleeve is concentrically disposed within an upper region of said immersion bath tank that tapers inwardly towards a bottom of said sleeve, an annular space being formed in between said sleeve and an inner surface of said immersion bath tank, wherein said material feeder is positioned to feed the product inside said sleeve and not outside of said sleeve.
  the material feeder is selected from the group consisting of a conveyor, a slide plate, a drip tray, and an injector.
  said one or more injection ports essentially consist of a single injection port disposed at a bottom region of said immersion bath tank.

a surge/storage tank is in fluid communication between said return line and said pump or propeller system.

an extraction system is adapted and configured to extract product from a bottom region of said immersion bath tank.

said extraction system comprises an upper isolation valve and a lower isolation valves in fluid communication on either side of an intermediate container.

said upper isolation valve has an open position allowing fluid communication between an interior bottom region of said immersion bath tank and said intermediate container and a closed position blocking fluid communication between an interior bottom region of said immersion bath tank and said intermediate container and a closed position blocking fluid communication.

said lower isolation valve has an open position allowing the product and the liquid nitrogen to empty out of said intermediate container and a closed position preventing the product and the liquid nitrogen from emptying out of said intermediate container.

said extraction system comprises: a tubular section fluidly communicating with a bottom interior region of said immersion bath tank; and a valve disposed at a downstream end of said tubular section, said valve being adapted and configured to be continuously operated to continuously allow slugs of the product and the liquid nitrogen to empty out of said tubular section, the valve being a butterfly valve, a gate valve, or a rotary valve.

said extraction system comprises an auger screw extending down at an angle into an interior bottom region of said immersion bath tank, and a porous conveyor belt disposed below a top of said screw.

a recovery tank is operatively associated with said extraction system adapted and configured to capture the liquid nitrogen from combined liquid nitrogen and product that is extracted by said extraction system and a return line in fluid communication between said recovery tank and a suction inlet of said pump or propeller system.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION

Figure 1:
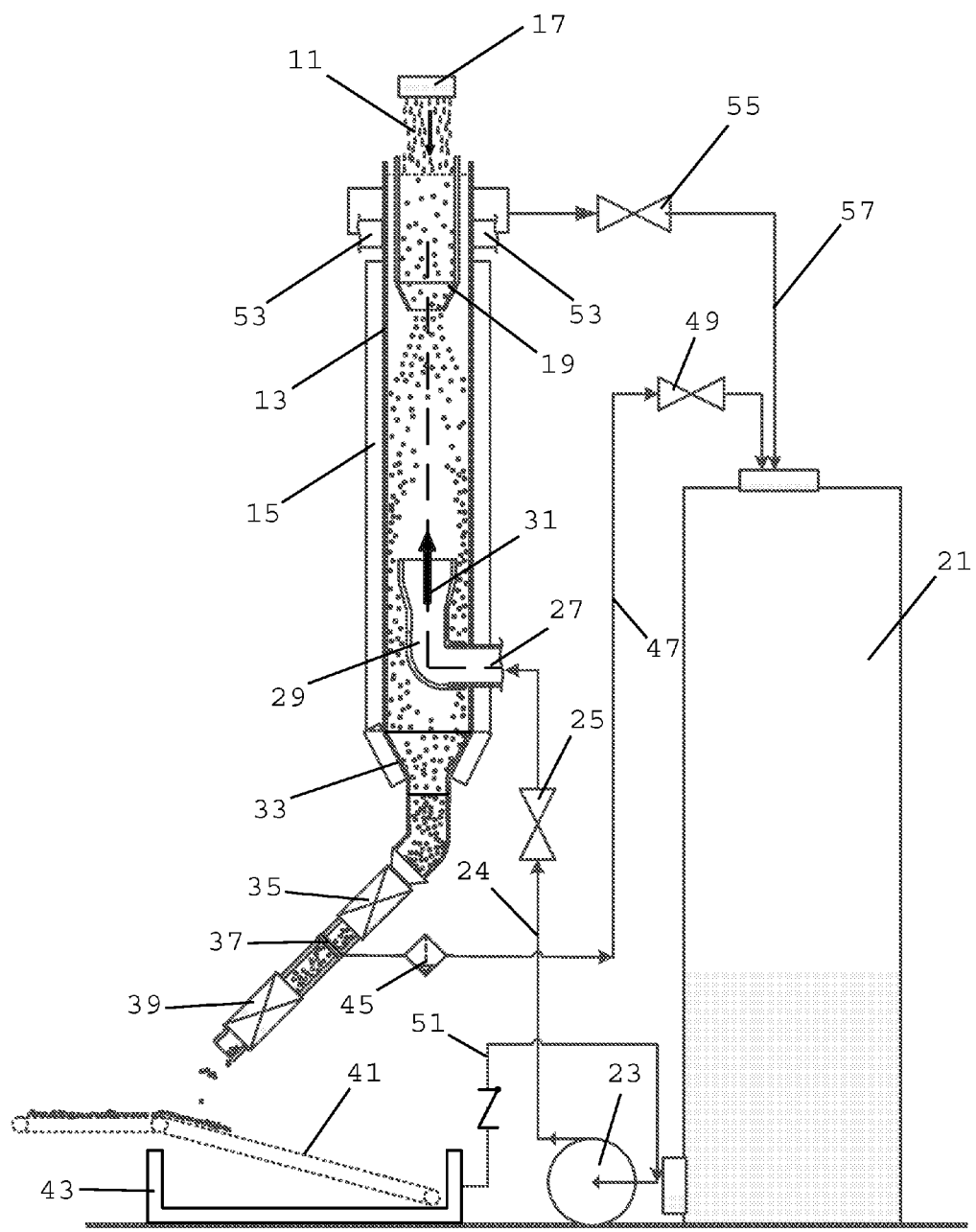
FIG. 1 is a side schematic view of an illustrative embodiment of the inventive vertical counter-flow immersion freezer.

The invention is directed to a vertical immersion freezer and a method of chilling or at least partially freezing product that travel through an immersion bath against a counter-current flow of liquid nitrogen. The freezer includes an insulated tank, a liquid nitrogen recirculation system, and a product extractor, and optionally an exhaust system to collect the nitrogen vapors. The method includes depositing the product onto a surface of a liquid nitrogen immersion bath contained in a vertical liquid nitrogen tank and letting the deposited product descend through the bath against a counter-current flow of liquid nitrogen.

The inventive freezer is vertically oriented. This means that its height is greater than its width or depth in a horizontal direction. Because of this orientation, the freezer has a liquid nitrogen capacity similar to conventional, horizontally oriented freezers but has a much smaller footprint. This is beneficial when the freezer competes for floor space in, for example, a food processing facility. The vertical orientation is also beneficial because, for a given volume of liquid nitrogen in the bath, the inventive freezer has a smaller bath surface to liquid nitrogen volume ration in comparison to conventional freezers. This substantially decreases evaporation losses due to heat exchange between the ambient air and the liquid nitrogen at the surface of the bath. In order to further decrease evaporation loss from transmission of heat to the liquid nitrogen from the ambient air across the tank wall, an exterior of the tank may be insulated. The tank may be configured with any desired cross-section but typically it is configured as a tube that optionally tapers inwardly at a bottom region. While the tank may be made of any material suitable for use with liquid nitrogen, typically it is made of stainless steel. For sanitation and maintenance purposes, the freezer may also be equipped with a drain valve.

The inventive freezer has no conveyor belt extending into the bath of liquid nitrogen. This means that the product that is to be chilled or at least partially frozen is not moved through the bath by the mechanical action of a conveyor belt. Rather, the product move through the bath by gravity against a counter-current flow of liquid nitrogen. By "counter-current flow", we mean that the direction of the flow of liquid nitrogen is vertically upward at substantially a 90° angle to horizontal even though the product descending downwardly through the bath may take a somewhat random course that at times deviates from straight down. By "substantially", we mean that the direction of the flow of liquid nitrogen is at about an 80-100° angle to horizontal.

Because the product to be chilled or at least partially frozen descend against a counter-current flow of liquid nitrogen, their residence time within the bath may be increased without having to increase the depth of the bath and increase the volume of liquid nitrogen.

Also, by orienting the freezer vertically and allowing the product to descend a counter-current flow of liquid nitrogen, the residence time of the product within the freezer may be varied simply by varying the velocity of the counter-current flow of liquid nitrogen. This may be easily varied by controlling the speed of the liquid nitrogen pump responsible for creating the counter-current flow of liquid nitrogen. For example, for product of a given shape and density and for a given depth of liquid nitrogen, the residence time of the product in the bath may be controlled by increasing or decreasing the pump speed. Thus, if greater or lesser cooling or freezing is desired, the residence may be decreased or increased at will. If the shape of the product to be deposited changes so as to create more (or less) drag as the product descend in the bath, and thus decrease (or increase) their descent rate, the pump speed may be decreased (increased) in order to slow down the rate of the liquid nitrogen counter-current flow. Similarly, if the density of the product to be deposited is increased (decreased), a pump speed increase (decrease) will provide the same effect. Moreover, if the heat content of the product to be deposited increases (or decreases) or a greater (or lesser) degree of chilling or at least partial freezing is desired, the pump speed may be increased (or decreased) in order to compensate for the change. The ease at which the residence time of the product within the immersion freezer may be adjusted provides the ability to chill or at least partially freeze a wide variety of item shapes, densities, thermal contents and the ability to chill or at least partially freeze product to varying degrees.

Many different types of item may be chilled or at least partially frozen with the inventive freezer. A non-limiting list includes: chemical suspensions, slurries or solutions; liquid, semi-solid or solid pharmaceutical products, liquid, semi-solid or solid foodstuffs; and liquid, semi-solid or solid food additives.

The product may be deposited onto a surface of the bath with a material feeder. The type of material feeder is driven by the type of item. Solids may be deposited with a conveyor or slide plate. Semi-solids, slurries, suspensions, and liquids may be deposited with a droplet-forming device. One example of the latter include a drip tray in which a liquid, slurry, suspension, or semi-solid falls by gravity through narrow tubes and drip out of the bottoms of the tubes in a uniform fashion. Another example is an injector which forcefully injects the liquid, semi-solid, suspension or slurry into the bath. Various types of injectors are disclosed by US 2007/0281067. Whether deposited by a drip tray or injector, the diameters of the droplets falling onto the bath surface may be adjusted simply by changing the die plate or nozzle size on the depositor.

The counter-current flow of liquid nitrogen is achieved with a single injection port disposed at a bottom region of the tank or with multiple injection ports which may be located a same depth or at varying depths within the tank. The type and quantity of injection ports can be optimized according to process requirements (e.g., position in the tube, quantity, diameter of the port(s), etc.). Typically, there is a single relatively large diameter injection port in a bottom region of the tank.

The counter-current flow of liquid nitrogen may be maintained indefinitely by recirculating the liquid nitrogen that reaches an upper level of the bath to a pump or propeller system which directs it back up again through the bath from a lower level of the bath. Typically, the liquid nitrogen is collected in one or more suction ports and re-injected into the bath from the injection port or ports via the pump or propeller system. Before being re-injected into the bath by the pump, the liquid nitrogen may optionally flow through a storage/surge tank. The height and number of suction ports can optimized according to process requirements (e.g., number of ports, height of ports, and/or diameter of the ports). Design factors for consideration include reduction of channeling and minimizing product breakage. Typically, the liquid nitrogen is collected and removed from the tank via two ports situated across from each other at a same tank height in order to minimize flow channeling and product channeling. The port(s) can be covered with a grill or solid directional plate to further direct flow and minimize unwanted effects.

In order to reduce turbulence at the surface of the bath (and thus increase evaporation of the liquid nitrogen), the product may be deposited onto a surface of the bath in an area that is surrounded by a vertically oriented sleeve that tapers as it extends downwardly. Thus, some of the counter-current flow of liquid nitrogen is urged away from the center of the tank by the sleeve and gently diverted towards the sides of the tank where it is collected by the one or more liquid nitrogen outlets.

The centrally disposed injection port may be tapered inwardly as it extends upwards. This serves to provide a more uniform residence time of the product within the immersion bath. As the product descending against the counter-current flow approach the exits of the injection port, where the velocity of the counter-current flow is at its greatest, the product is urged towards the walls of the tank. This decreases the tendency of the product to follow a more random path of descent through the bath caused by the turbulent force of the high velocity counter-current flow near the exits of the port.

The lower portion of the tank may be tapered in order to render extraction (with the extraction system) of the accumulated now-solid product from the tank easier. The extraction system withdraws the product from the freezer by any method/device known in the field of immersion freezers. One of ordinary skill in the art will recognize that the product to be chilled or at least partially frozen are either already in solid form before being deposited into the bath or are frozen into solid product from a liquid, semi-solid, slurry or suspension product.

In one embodiment, the extraction system is disposed below the liquid nitrogen tank and includes two isolation valves (upper and lower) in series on either side of an intermediate container. The upper valve separates the intermediate container from a bottom of the tank while the lower valve separates the intermediate container from liquid nitrogen/solid product separator that acts to separate the liquid nitrogen from the product. In operation, product is recovered at the bottom of the tank downstream from the region of the tank where the counter current flow is initiated. The first valve is open while the second valve remains closed. The product falls and accumulates into a narrow section of tube (forming the intermediate container) onto the second valve. When a sufficient amount of product is accumulated or a sufficient amount of time has elapsed, the first valve is closed. The product and a small volume of liquid nitrogen are now isolated from the main volume in the tank. The second valve is opened and the product along with the small volume of liquid nitrogen falls into a recovery chamber. Product in the recovery chamber is then removed and transported by a conveyor for further processing and/or packaging. Configuration of the recovery chamber can be optimized to provide further freezing in the liquid nitrogen which has accumulated in the chamber. Alternatively the liquid nitrogen could be re-injected into the freezer (i.e., recirculated) via the recirculation pump or propeller system or by a separate recovery pump. The upper and lower valves may be any type of valves known in the art as being suitable for allowing a flow of a liquid nitrogen/solid product. Typically, they are butterfly valves but they may instead be gate valves, globe valves, or ball valves or a combination of different valves.

In another embodiment, the product may be continuously extracted from the freezer from the tapered section downstream from the region of the tank where the counter current flow is initiated. The tapered section leads to a short tubular section introducing a restriction at the product outlet. The product and liquid nitrogen are diverted into a discharge device comprising a valve—typically a butterfly valve but optionally a gate or rotary valve. The discharge device may be controlled by a level alarm on a nitrogen recovery tray below the discharge device. The opening to the discharge device may be constricted in order to reduce both the flow of product and the liquid nitrogen at the bottom of the tank according to the level in the recovery tray. Liquid nitrogen is recovered in the sealed recovery tray beneath the discharge device and recycled to the liquid nitrogen feed to the tank via the recirculation pump or propeller system or by a separate recovery pump. The tray includes a small opening allowing the product to be transported via a screw, mesh or wire conveyor, basket or bucket elevator to the next phase of production.

In yet another embodiment, the product may be withdrawn by an auger screw which extends down into a bottom of the liquid nitrogen tank containing the bath. The bottom region of the tank is slanted so as to concentrate the accumulating product in a smaller volume into which the bottom end of the auger screw extends. By rotating the auger screw, the product and liquid nitrogen are urged upwardly by the threads of the screw to a liquid/solid separation device where the product is separated from the liquid nitrogen. For example, the liquid/solid separation device may be a conveyor belt that receives a cascading flow of the liquid nitrogen and product that allows the liquid nitrogen to fall through the porous belt while retaining the product. One of ordinary skill in the art will recognize that the separated product may either have already been in solid before introduction into the freezer or they may have been frozen into solid form from the liquid, semi-solid, slurry or suspension deposited into the bath.

Depending on which product extraction system is adopted, the process can be either classified as continuous or semi-continuous with respect to product flow. Additional vertical immersion freezers according to the invention can optionally be used in parallel in order to continuously receive the product to be chilled or at least partially frozen. Thus, if operation of one freezer is halted, the feed of product to be chilled or at least partially frozen may be redirected to the additional freezer(s) with a diverter valve, conveyor change or by other known methods. This would provide a near-continuous process depending on the number of freezers and desired product throughput.

The same suction ports for recirculating the flow may also be used for removal of the liquid nitrogen from the tank. Alternatively, one or more suction ports can be dedicated to this removal. Three way valves or solenoid valves and a pump (which could be the same pump for creating the counter-current flow or a separate pump) may be used to drain the liquid nitrogen from the tank and into the storage tank until most of the liquid nitrogen has been drained from above the product. Once most of the liquid nitrogen is removed, the extraction system may be operated to remove the product from the tank. Removal of the liquid nitrogen from the tank may be done for several purposes including maintenance or when a production shift is dropped in which case removal of the liquid nitrogen prevents unnecessary and wasteful evaporation of the liquid nitrogen during periods of non-operation. Level instrument devices such as bubblers, acoustic sensors, or load cells may be used to determine the level of the immersion bath and of the liquid nitrogen in the storage/surge tank. This will help to control the amount of liquid nitrogen removed from the tank containing the immersion bath and the amount of liquid nitrogen being maintained in both the immersion bath tank and the storage/surge tank. Additionally, a low level can be maintained in the nitrogen storage/surge tank in order to minimize any recirculation issues and cavitation. Cavitation within the liquid nitrogen can cause excessive evaporation affecting the freezing performance.

While the inventive freezer may be used for chilling or at least partially freezing low, medium, or large capacities of product and a wide variety of types of product, it is particularly advantageous for small and medium sized food processors wanting to individually quick freeze (IQF) and/or portion their solid, semi-solid and/or liquid food products using only a minimal footprint in their plant. Otherwise, the product suitable for chilling and/or at least partially freezing in practice of the invention includes but is not limited to: pharmaceuticals, foodstuffs, food additives, and chemical solutions.

The freezer combines the benefits of both tunnel and immersion freezers with a much smaller footprint. For example, the combination of freezing in the vertical dimension with a countercurrent liquid nitrogen flow allows for an increase in residence time of the product in the bath without having to vary the height of the freezer. A same freezer can therefore process different types, sizes, shapes, heat contents, and densities of product simply by varying the counter-current flow rate of liquid nitrogen with the pump or propeller system.

The absence of a conveyor within the liquid nitrogen bath renders the freezer more versatile for individual quick freezing of solids, semi-solids or liquids. Cryogen losses are minimized because the surface to volume ratio of the bath is quite smaller than that of conventional immersion baths. There is also the possibility of using cold, gaseous nitrogen (from evaporation of the liquid nitrogen) to post-cool the product after their removal from the bath.

Two illustrative embodiments will now be described with reference to the FIGS.

Figure 2:
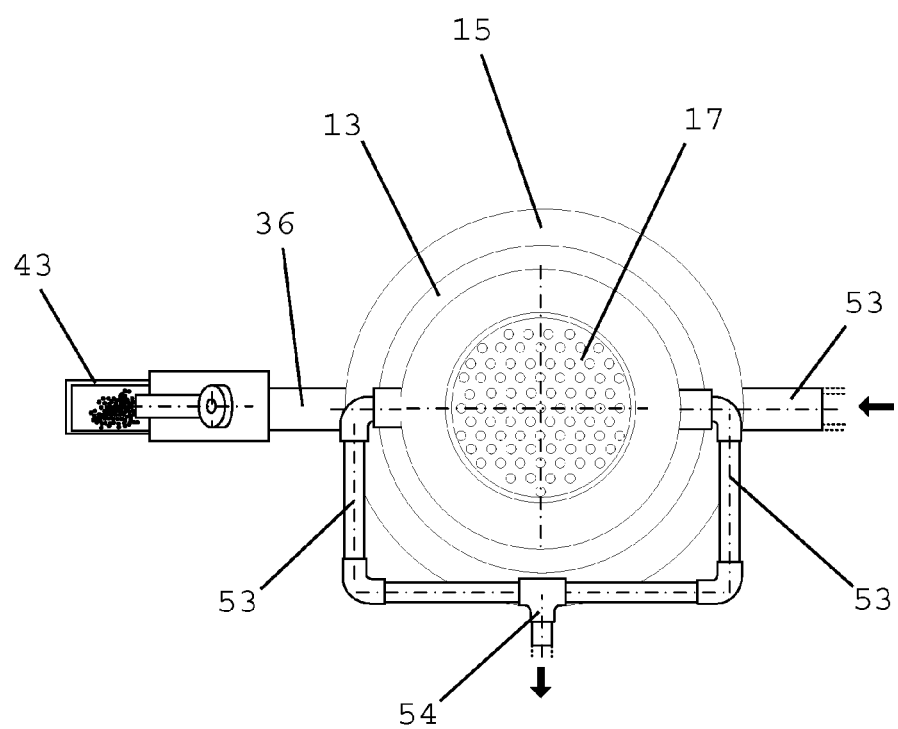
FIG. 2 is a top schematic view of the freezer of FIG. 1.

As best shown in FIGS. 1-2, droplets 11 of a liquid, semi-solid, slurry or suspension are deposited onto the surface of an immersion bath of liquid nitrogen contained in a tubular tank 13 provided with an insulation layer 15. The droplets are deposited with a drip try or injector material feeder 17. The droplets 11 begin to at least partially freeze within a tubular sleeve 19.

Liquid nitrogen is pumped from a storage/surge tank 21 with a pump 23 to provide a flow of liquid nitrogen in a feed conduit 24. Via valve 25 and inlet 27, the liquid nitrogen enters into an injection port 29 from which the counter-current flow 31 is initiated. The counter-current flow 31 of liquid nitrogen upward counteracts the descent of the product through the immersion bath. As the product descends towards the outlet of the injection port 29, the product is urged towards the wall of the tube 13.

The product descends through a conical section 33 ending with a short tube above the extraction system. The extraction system includes, in flow-wise order, an upper isolation valve 35, an intermediate container 37 including a saddle for extraction of gaseous nitrogen, and a lower isolation valve 39. Gaseous nitrogen is separated from any entrained liquid nitrogen at phase separator 45 and is in fluid communication with a headspace of the storage/surge tank 21 via gas return line 47 and valve 49. The upper isolation valve 35 is periodically opened to allow a slug of liquid nitrogen and product to empty out of the tube 13 and into the intermediate container 37. After valve 35 is closed, the lower isolation valve 39 is opened to allow a cascade of liquid nitrogen and product to fall upon a conveyor belt 41. The belt 41 captures the product but allows the liquid nitrogen to pass through to a sealed recovery tray 43. The conveyor belt 41 conveys the product away for further processing as necessary. Liquid nitrogen is removed from tray 43 through connection to the suction inlet of pump 23 via recovery line 51.

The sleeve is tapered outwardly extending from the bottom so as to urge the counter-current flow 31 towards the wall of the tube 13. The liquid nitrogen is withdrawn from the tube 13 by suction ports 53 which feed into a common line 54. The liquid nitrogen is returned to the storage/surge tank 21 via valve 55 and return line 57.

Figure 3:
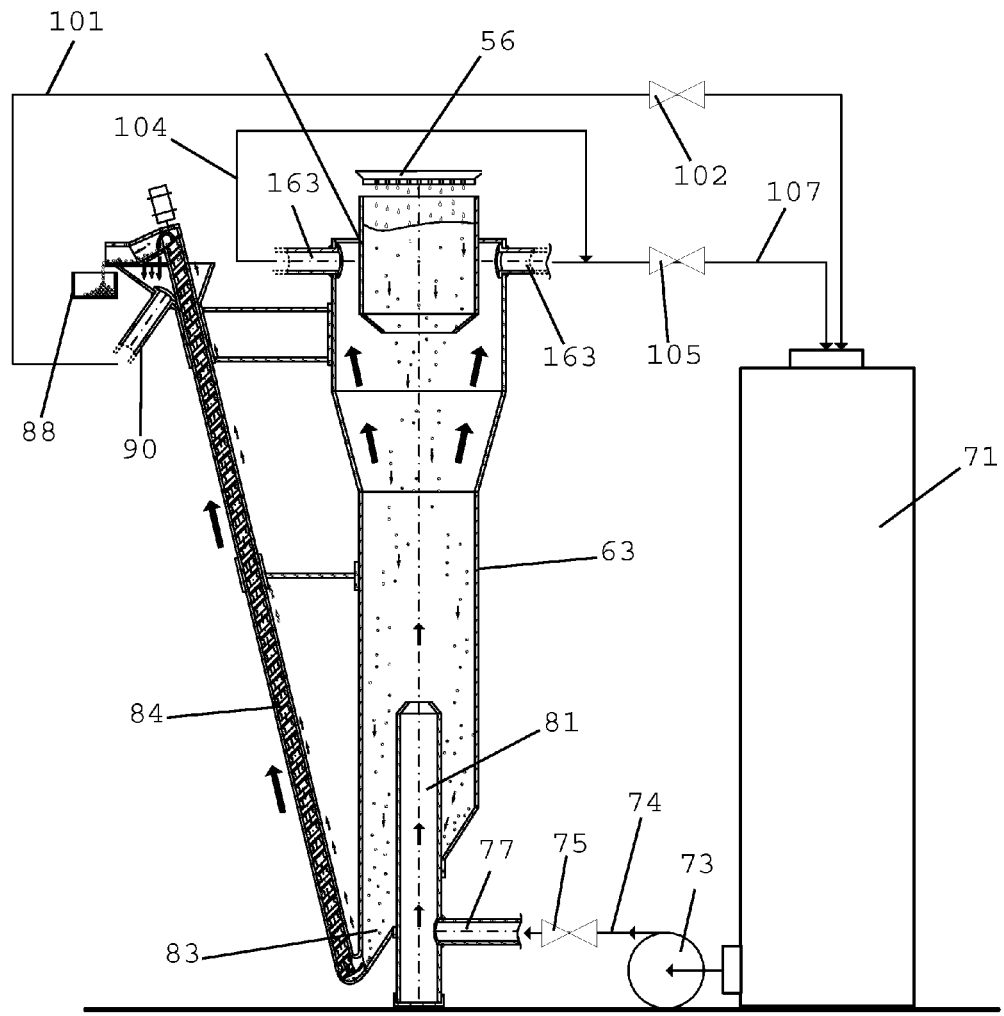
FIG. 3 is a side schematic view of an alternative embodiment of the inventive vertical counter-flow immersion freezer.

As best illustrated in FIG. 3, droplets 61 of a liquid, semi-solid, suspension or slurry fall onto the surface of an immersion bath of liquid nitrogen contained in a tubular tank 63. The droplets 61 are formed with a drip tray or injector material feeder 67. The droplets 61 begin to at least partially freeze within a tubular sleeve 69 that is tapered toward the bottom.

Liquid nitrogen is pumped from a storage/surge tank 71 with a pump 73 to provide a flow of liquid nitrogen in a feed conduit 74. Via valve 75 and inlet 77, the liquid nitrogen enters into an injection port 79 from which the upward counter-current flow 81 of liquid nitrogen is initiated. The counter-current flow 81 counteracts the descent of the product through the immersion bath. The bottom region 83 of the tank 63 is slanted so as to concentrate the product in a smaller volume.

The extraction system includes an auger screw 84 and a conveyor belt 86. The auger screw 84 extends into the bottom region 83. As the auger screw 84 is rotated, the product and some liquid nitrogen are withdrawn from the bottom region 83 by the threads of the auger screw 84. As the product and liquid nitrogen reaches the top tier of the threads of the auger screw 84, the combined product and liquid nitrogen cascades down upon a conveyor belt 86. The conveyor belt 86 captures the product but lets the liquid nitrogen pass through and into a chute 90 leading to a return line 101. From there, the liquid nitrogen returns to the storage/surge tank 63 via valve 102. The conveyor belt 86 conveys the product to a container 88 for further processing as necessary.

The sleeve 69 tapers outwardly from the bottom thereof so as to urge the liquid nitrogen towards the wall of the tube 63. The liquid nitrogen is withdrawn from the tube 63 via opposed suction ports 103 and feed into a line 104. From there, the liquid nitrogen returns to the storage/surge tank 63 via valve 105 and line 107.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for chilling or at least partially freezing product in an immersion freezer containing a bath of liquid nitrogen, the bath of liquid nitrogen being contained within an insulated immersion bath tank, said method comprising the steps of:
    depositing, with a material feeder, a feed of the product to be chilled or frozen onto a surface of the liquid nitrogen bath;
    allowing the deposited product to descend down through the bath against a counter-current flow of liquid nitrogen through the bath to produce chilled or at least partially frozen product; and
    extracting the chilled or at least partially frozen product from the bath, wherein:
        the tank has one or more suction ports disposed at an upper region of said tank that fluidly communicate with one or more injection ports that are disposed within an interior of the tank; and
        liquid nitrogen is received from said one or more suction ports and injected straight up through the interior of the tank via said one or more injection ports so as to create said counter-current flow of liquid nitrogen.

2. The method of claim 1, wherein the product is a liquid, semi-solid, suspension or slurry.

3. The method of claim 1, wherein the product is solid.

4. The method of claim 1, wherein the product is selected from the group consisting of: a chemical suspension, slurry or solution; a liquid, semi-solid or solid pharmaceutical product; a liquid, semi-solid or solid foodstuff; and a liquid, semi-solid or solid food additive.

5. The method of claim 1, wherein said step of extracting the product comprises the steps of:
    opening an upper isolation valve in fluid communication with a bottom interior region of a tank containing the liquid nitrogen bath;
    allowing a slug of liquid nitrogen and the product to empty out of the tank and into an intermediate container via the open upper isolation valve, the slug being prevented from flowing down out of the intermediate container by a closed lower isolation valve;
    closing the upper isolation valve;
    opening the lower isolation valve to allow the slug to flow down out of the intermediate container.

6. The method of claim 1, wherein said step of extracting the product comprises the step of continuously operating a valve fluidly communicating with a bottom interior of a tank containing the liquid nitrogen immersion bath to place said continuously operated valve in succeeding ones of a plurality of positions, wherein each position allows an amount of liquid nitrogen and product to empty from the tank, wherein said valve is a butterfly, gate, or rotary valve.

7. The method of claim 1, wherein said step of extracting the product comprises the steps of:

rotating an auger screw having a bottom end that extends into a bottom interior region of a tank containing the liquid nitrogen immersion bath to convey liquid nitrogen and product from the bottom interior region to a top of the auger screw; and allowing the conveyed liquid nitrogen and product to cascade off of the top of the auger screw.

8. A method for chilling or at least partially freezing product in an immersion freezer containing a bath of liquid nitrogen, said method comprising the steps of:

depositing the product to be chilled or frozen onto a surface of the liquid nitrogen bath;

allowing the deposited product to descend down through the bath against a counter-current flow of liquid nitrogen through the bath to produce chilled or at least partially frozen product; and extracting the chilled or at least partially frozen product from the bath, wherein the counter-current flow is produced by pumping liquid nitrogen with a pump into an injection port comprising a vertical tube that is disposed within a bottom interior portion of a tank containing the bath and liquid nitrogen is recirculated from a top region of the tank via one or more suction portions and to a suction inlet of the pump.

9. The method of claim 8, further comprising the step of changing a residence time of the product within the immersion bath by changing a speed of the pump.

10. A vertical liquid nitrogen immersion freezer, comprising:

an insulated immersion bath tank adapted and configured to contain an immersion bath of liquid nitrogen;

a material feeder operatively associated with said immersion bath tank to deliver a feed of product to the liquid immersion bath contained within said immersion bath tank for chilling or at least partially freezing the product;

a pump or propeller system;

one or more injection ports fluidly communicating with an outlet side of said pump or propeller system via a feed line extending through a wall of said immersion bath tank, said one or more injection ports being disposed within an interior receiving liquid nitrogen from the pump and being adapted and configured to inject liquid nitrogen straight up through the interior of said immersion bath tank; and one or more suction ports disposed at an upper region of said immersion bath tank and fluidly communicating between an interior of said immersion bath tank and a return line that fluidly communicates with a suction inlet side of said pump or propeller system, said one or more suction ports withdrawing liquid nitrogen from said immersion bath tank through operation of said pump or propeller system and directing the withdrawn liquid nitrogen into said return line.

11. The freezer of claim 10, wherein said immersion bath tank has a tubular configuration that is tapered inwardly towards a bottom region of said immersion bath tank.

12. The freezer of claim 11, further comprising a sleeve concentrically disposed within an upper region of said immersion bath tank that tapers inwardly towards a bottom of said sleeve, an annular space being formed in between said sleeve and an inner surface of said immersion bath tank, wherein said material feeder is positioned to feed the product inside said sleeve and not outside of said sleeve.

13. The freezer of claim 10, wherein the material feeder is selected from a group consisting of a conveyor, a slide plate, a drip tray, and an injector.

14. The freezer of claim 10, wherein said one or more injection ports essentially consist of a single injection port disposed at a bottom region of said immersion bath tank.

15. The freezer of claim 10, further comprising a surge/storage tank in fluid communication between said return line and said pump or propeller system.

16. The freezer of claim 10, further comprising an extraction system adapted and configured to extract product from a bottom region of said immersion bath tank.

17. The freezer of claim 16, wherein said extraction system comprises:

a tubular section fluidly communicating with a bottom interior region of said immersion bath tank; and a valve disposed at a downstream end of said tubular section, said valve being adapted and configured to be continuously operated to continuously allow slugs of the product and the liquid nitrogen to empty out of said tubular section, the valve being a butterfly valve, a gate valve, or a rotary valve.

18. The freezer of claim 16, wherein said extraction system comprises an auger screw extending down at an angle into an interior bottom region of said immersion bath tank, and a porous conveyor belt disposed below a top of said screw.

19. The freezer of claim 16, further comprising a recovery tank operatively associated with said extraction system adapted and configured to capture the liquid nitrogen from combined liquid nitrogen and product that is extracted by said extraction system and a return line in fluid communication between said recovery tank and the suction inlet of said pump or propeller system.

20. The freezer of claim 10, wherein:

an extraction system comprises an upper isolation valve and a lower isolation valve in fluid communication on either side of an intermediate container;

said upper isolation valve has an open position allowing fluid communication between the interior bottom region of said immersion bath tank and said intermediate container and a closed position blocking fluid communication between an interior bottom region of said immersion bath tank and said intermediate container;

said lower isolation valve has an open position allowing the product and the liquid nitrogen to empty out of said intermediate container and a closed position preventing the product and the liquid nitrogen from emptying out of said intermediate container.

* * * * *